United States Patent
Itoh et al.

(10) Patent No.: US 9,697,935 B2
(45) Date of Patent: *Jul. 4, 2017

(54) PTC THERMISTOR CERAMIC COMPOSITION AND PTC THERMISTOR ELEMENT

(71) Applicant: TDK CORPORATION, Tokyo (JP)

(72) Inventors: Kazuhiko Itoh, Tokyo (JP); Yoshikazu Shimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 14/774,824

(22) PCT Filed: Feb. 17, 2014

(86) PCT No.: PCT/JP2014/053579
§ 371 (c)(1),
(2) Date: Sep. 11, 2015

(87) PCT Pub. No.: WO2014/141814
PCT Pub. Date: Sep. 18, 2014

(65) Prior Publication Data
US 2016/0027560 A1   Jan. 28, 2016

(30) Foreign Application Priority Data
Mar. 11, 2013   (JP) .................................. 2013-047850

(51) Int. Cl.
| H01C 7/10 | (2006.01) |
| H01C 7/02 | (2006.01) |
| C04B 35/468 | (2006.01) |
| H01C 1/14 | (2006.01) |
| H01C 7/00 | (2006.01) |

(52) U.S. Cl.
CPC ......... *H01C 7/025* (2013.01); *C04B 35/4682* (2013.01); *H01C 1/1406* (2013.01); *H01C 7/008* (2013.01); *H01C 7/02* (2013.01); *C04B 2235/3201* (2013.01); *C04B 2235/3208* (2013.01); *C04B 2235/3224* (2013.01); *C04B 2235/3225* (2013.01); *C04B 2235/3227* (2013.01); *C04B 2235/3229* (2013.01); *C04B 2235/3239* (2013.01); *C04B 2235/3251* (2013.01); *C04B 2235/3262* (2013.01); *C04B 2235/3298* (2013.01); *C04B 2235/3418* (2013.01)

(58) Field of Classification Search
CPC ...... H01C 7/025; H01C 1/1406; H01C 7/008; H01C 7/027
USPC ................................................. 338/22 R, 13
See application file for complete search history.

(56) References Cited

U.S. PATENT DOCUMENTS

| | | | | |
|---|---|---|---|---|
| 6,187,707 B1* | 2/2001 | Kakihara | ............... | H01C 7/025 501/138 |
| 6,221,800 B1* | 4/2001 | Takahashi | ........... | C04B 35/4682 501/137 |
| 6,911,893 B2* | 6/2005 | Kodama | ............... | C01G 23/002 257/E29.1 |
| 7,348,873 B2* | 3/2008 | Niimi | ...................... | B32B 18/00 257/528 |
| 7,764,161 B2* | 7/2010 | Katsu | .................. | C04B 35/4682 252/500 |
| 8,009,012 B2* | 8/2011 | Kajino | ..................... | H01C 1/14 29/610.1 |
| 8,228,161 B2* | 7/2012 | Abe | .................... | C04B 35/4682 252/511 |
| 9,362,031 B2* | 6/2016 | Shimura | ................ | H01C 7/025 |
| 2002/0130318 A1* | 9/2002 | Kodama | .............. | C01G 23/002 257/43 |
| 2007/0115090 A1* | 5/2007 | Niimi | ...................... | B32B 18/00 338/22 R |
| 2007/0202036 A1* | 8/2007 | Jongen | ................... | B82Y 30/00 423/593.1 |
| 2008/0170977 A1* | 7/2008 | Shimada | ............... | C01G 23/006 423/263 |

(Continued)

FOREIGN PATENT DOCUMENTS

| CN | 102531575 A | 7/2012 |
| EP | 2078707 A1 | 7/2009 |

(Continued)

OTHER PUBLICATIONS

Apr. 1, 2014 International Search Report issued in International Patent Application No. PCT/JP2014/053579.
Apr. 1, 2014 Written Opinion issued in International Patent Application No. PCT/JP2014/053579.

*Primary Examiner* — Kyung Lee
(74) *Attorney, Agent, or Firm* — Oliff PLC

(57) ABSTRACT

A barium titanate based PTC thermistor ceramic composition without using Pb. Its Curie temperature is shifted to a temperature higher than 120° C. The PTC thermistor can readily turn semiconductive even if it is sintered in air. The resistivity at 25° C. is low and the variation rate of the resistivity at 25° C. with time is little. The PTC thermistor ceramic composition includes a sintered body having a barium titanate based compound represented by formula (1) as the main component, $(Ba_{1-x-y-w}Bi_xA_yRE_w)_\alpha(Ti_{1-z}TM_z)O_3$ (1), wherein, $1.02y \leq x \leq 1.5y$ (2), $0.007 \leq y \leq 0.125$ (3), $0 \leq (w+z) \leq 0.01$ (4), $0.97 \leq \alpha \leq 1.06$ (5), and the sintered body contains Ca in a ratio of 0.01 mol or more and less than 0.05 mol relative to 1 mol of Ti site in terms of element.

16 Claims, No Drawings

(56) References Cited

U.S. PATENT DOCUMENTS

| | | | |
|---|---|---|---|
| 2009/0027158 A1* | 1/2009 | Kajino | H01C 1/14 |
| | | | 338/22 R |
| 2010/0084619 A1 | 4/2010 | Katsu | |
| 2011/0215894 A1 | 9/2011 | Kishimoto et al. | |
| 2012/0175361 A1 | 7/2012 | Ino et al. | |
| 2015/0097650 A1* | 4/2015 | Shimura | H01C 7/025 |
| | | | 338/22 SD |

FOREIGN PATENT DOCUMENTS

| | | |
|---|---|---|
| EP | 2 371 789 A1 | 10/2011 |
| JP | S56-169301 A | 12/1981 |
| JP | 2008-063188 A | 3/2008 |
| JP | 2009-256179 A | 11/2009 |
| JP | 2012-004496 A | 1/2012 |
| WO | 2008/152976 A1 | 12/2008 |
| WO | 2010/067867 A1 | 6/2010 |
| WO | 2011/043344 A1 | 4/2011 |

\* cited by examiner

PTC THERMISTOR CERAMIC COMPOSITION AND PTC THERMISTOR ELEMENT

The present invention relates to a PTC thermistor ceramic composition and a PTC thermistor element which are used in a heater element or a sensor for detecting overheat.

BACKGROUND

A thermistor having positive temperature coefficient of resistance is known as a PTC (Positive Temperature Coefficient) thermistor. The resistance in the PTC thermistor increases as the temperature rises, so the PTC thermistor is used as a self-controlling heater, an over-current protection element, a temperature sensor or the like. In the past, the PTC thermistor was formed by adding a trace of rare earth based elements or the like into the main component of barium titanate ($BaTiO_3$) to turn it into a semiconductor. The resistance of the thermistor is low under a temperature below the Curie temperature; however, it will be sharply increased by several orders of magnitude under a temperature above the Curie temperature.

Usually, the Curie temperature of barium titanate is about 120° C. When part of Ba is replaced by Sr or Sn, it will shift to a lower temperature. However, for shifting the Curie temperature towards a higher temperature, the current method is replacing part of Ba by Pb. Thus, an alternative material without using Pb is required to be applied from the viewpoint of the worldwide trend of reducing the environmental burden.

A method for preparing a PTC thermistor has been disclosed in the following Patent Document 1. In particular, more than one selected from Nb, Ta or rare earth elements is added to a composition with a structure of $Ba_{1-2x}(BiNa)_xTiO_3$ ($0<X\leq0.15$) which is formed by replacing part of Ba with (BiNa) rather than Pb. The resultant mixture is sintered in a nitrogen atmosphere and then subjected to a thermal treatment in an oxidative atmosphere.

In addition, a Pb-free PTC thermistor has been disclosed in the following Patent Document 2 which is obtained by sintering a composition in a nitrogen atmosphere. In the mentioned composition, $Ba_mTiO_3$ based composition is used as the main component and the molar ratio m of A site to B site is set to be $1.001\leq m\leq1.01$. In addition, part of Ba constituting the A site is replaced by Na, Bi, Ca and the rare earth elements, and Ca is contained with its molar ratio to 1 mol of the A site being 0.05 to 0.20.

Further, the following Patent Document 3 has disclosed a ceramic composition for PTC thermistor without using Pb. In this ceramic composition, Ba, Ti, Bi, O are all contained as the necessary elements, and one or more kinds of monovalent alkali metals are contained. The molar ratio $X_2$ of the monovalent alkali metal to Bi is $0.65\leq X_2\leq1.59$, and 480 ppm or less of Nb is contained. In addition, the amount of Sb, Ta or each rare earth element is 10 ppm or less respectively.

It has been described in any of these Patent Documents that a PTC thermistor as follows could be provided. The PTC thermistor is Pb free and has its Curie temperature shifted to a temperature higher than 120° C. In addition, its resistivity at room temperature is low. Further, the ratio of the resistivity at room temperature and the increased resistivity above the Curie temperature (referred to as "PTC jump" hereinafter for convenience) are quite great.

PATENT DOCUMENT

Patent Document 1: JP-A-S56-169301
Patent Document 2: WO2010/067867A1
Patent Document 3: JP-A-2008-63188

SUMMARY

In the Examples of Patent Document 1, it has been described about the results of the case in which after Nd is added into the composition with a structure of $Ba_{1-2x}(BiNa)_xTiO_3$ ($0<X\leq0.15$) and the resultant mixture is subjected to a sintering process in a nitrogen atmosphere, a thermal treatment under an oxidative atmosphere is applied. However, there is no detailed description about the case with other donors. Also, it is not clear whether the properties have been improved or to what extent the properties have been improved. Moreover, as the composition cannot turn semiconductive if the sintering process is performed in air, a problem rises that the preparation cost will increase compared to the case where the sintering process is performed in air.

In addition, the Examples in Patent Document 2 has shown a Pb-free PTC thermistor which is represented by $(Ba_{1-w-x-y-z}Na_wBi_xCa_yLa_z)_mTiO_3+0.00025Mn$ ($1.001\leq m\leq1.01$, $0.05\leq y\leq0.20$, $0.02\leq(w+x)\leq0.2$, $0.0005\leq z\leq0.015$) and is sintered in a nitrogen atmosphere. However, the composition cannot turn semiconductive if the sintering process is performed in air, thus, a problem rises that the preparation cost will increase compared to the case where the sintering process is performed in air.

In addition, in Patent Document 3, it has been described that a compounding material for PTC thermistor in which the molar ratio $X_1$ of monovalent alkali metal to Bi is in the range of $1.03\leq X_1\leq3.16$ is used, and a sintered body of PTC thermistor in which the molar ratio $X_2$ of monovalent alkali metal to Bi is in the range of $0.65\leq X_2\leq1.59$ is sintered in either air or a reducing atmosphere.

However, when the PTC thermistor is electrified and used as a heater, problems concerning the change of the resistivity at 25° C. with time may be generated.

In view of the situations mentioned above, the present invention aims to provide a PTC thermistor ceramic composition and a PTC thermistor which is a barium titanate based PTC thermistor without using Pb and whose Curie temperature is shifted to a temperature higher than 120° C. Also, the PTC thermistor can readily turn semiconductive no matter it is sintered in air or in a nitrogen atmosphere. Further, the resistivity at 25° C. is low and the variation rate of the resistivity at 25° C. with time (referred to as "resistivity variation" hereinafter for convenience) is little.

As the result of various studies provided to solve the mentioned problem, the inventors of the present invention found that, in the barium titanate based PTC thermistor, by replacing part of Ba with a specified amount of Bi and alkali metal(s) A (Na or K) rather than Pb and adjusting the molar ratio of Ba site to Ti site and the additive amount of Ca to specified ranges, a PTC thermistor can be obtained. The PTC thermistor can easily turn semiconductive and its resistivity at 25° C. is low and the Curie temperature shifts to a temperature higher than 120° C. In addition, the resistivity variation can be decreased even the PTC thermistor of the present invention is used as a heater element.

The inventors of the present invention consider the reason why the PTC thermistor shows such properties is as follows. By adjusting the ratio of Bi to the alkali metal A (Na or K) to have excess Bi, the excess Bi will promote the PTC thermistor turning semiconductive and also will function as sintering aids to promote a proper growth of grains. As a result, a PTC thermistor with a low resistivity at 25° C. can be obtained no matter it is sintered either in air or in a nitrogen atmosphere. Further, they consider that abnormal growth of grains will be inhibited by keeping the molar ratio of Ba site to Ti site at a specified range, and the precipitation of the alkali metal A towards the grain boundaries as well as the movement of the alkali metal A when electrified will be inhibited by restricting the additive amount of Ca to a specified range, thus, as a result, a PTC thermistor having a small resistivity variation will be provided. However, the mechanism of turning semiconductive is not limited to those mentioned above.

The PTC thermistor ceramic composition of the present invention is characterized in that it contains a sintered body having a barium titanate based compound as the main component, wherein, the barium titanate can be represented by the following formula (1) when Ti site is defined as 1 mol.

$$(Ba_{1-x-y-w}Bi_xA_yRE_w)_\alpha(Ti_{1-z}TM_z)O_3 \quad (1)$$

In formula (1), A represents at least one element selected from the group consisting of Na and K, RE represents at least one element selected from the group consisting of Y, La, Ce, Pr, Nd, Sm, Gd, Dy and Er, TM represents at least one element selected from the group consisting of V, Nb and Ta, and w, x, y, z (mol as the unit for each) and α (the molar ratio of Ba site to Ti site) satisfy the following in equations (2) to (5).

$$1.02y \leq x \leq 1.5y \quad (2)$$

$$0.007 \leq y \leq 0.125 \quad (3)$$

$$0 \leq (w+z) \leq 0.01 \quad (4)$$

$$0.97 \leq \alpha \leq 1.06 \quad (5)$$

In the sintered body, Ca is contained in a ratio of 0.01 mol or more and less than 0.05 mol in terms of element.

Preferably, the PTC thermistor ceramic composition further contains Si in a ratio of 0.035 mol or less relative to 1 mol of Ti site in terms of element. If Si is contained within the range mentioned above, an effect on decreasing the resistivity variation will be provided.

Besides, preferably, the PTC thermistor ceramic composition contains Mn in a ratio of 0.0015 mol or less relative to 1 mol of Ti site in terms of element. If Mn is contained within the range mentioned above, an effect on improving the PTC jump will be provided.

In addition, it is preferable that both Na and K are contained as A in the PTC thermistor ceramic composition and the molar ratio of Na to K is 6/4 or more and 9/1 or less. If the molar ratio of Na to K falls within the range mentioned above, an effect on lowering the resistivity at 25° C. will be further enhanced.

Further, the present invention also relates to a PTC thermistor element that is provided with a ceramic element formed by using the PTC thermistor ceramic composition mentioned above and electrodes formed on the surface of the ceramic element.

The present invention provides a PTC thermistor. The PTC thermistor is a barium titanate based one which can readily turn semiconductive no matter sintered in air or in a nitrogen atmosphere and has a resistivity at 25° C. as low as $10^3$ Ωcm or even lower, a resistivity variation as small as 20% or even smaller and a Curie temperature shifted to a temperature higher than 120° C.

DETAILED DESCRIPTION OF EMBODIMENTS

The composition of the present invention contains a substance which can be represented by the following formula (1) according to the molar ratio relative to 1 mol of Ti site as the main component and Ca as the sub-component, $$(Ba_{1-x-y-w}Bi_xA_yRE_w)_\alpha(Ti_{1-z}TM_z)O_3 \quad (1)$$

In formula (1), A represents at least one selected from the group consisting of Na and K, RE represents at least one element selected from the group consisting of Y, La, Ce, Pr, Nd, Sm, Gd, Dy and Er, and TM represents at least one element selected from the group consisting of V, Nb and Ta.

In formula (1), w, x, y, z and α satisfy the following in equations (2) to (5), wherein w, x, and y respectively represent the amounts of Bi, A and RE to replace part of Ba site, z represents the amount of TM to replace part of Ti site, and α represents the ratio of Ba site to Ti site. However, the replacement of Ba site with RE and the replacement of Ti site with TM are optional.

$$1.02y \leq x \leq 1.5y \quad (2)$$

$$0.007 \leq y \leq 0.125 \quad (3)$$

$$0 \leq (w+z) \leq 0.01 \quad (4)$$

$$0.97 \leq \alpha \leq 1.06 \quad (5)$$

Further, relative to the composition represented by formula (1), Ca is contained in a ratio of 0.01 mol or more and less than 0.05 mol in terms of element.

Preferably, Si is contained in the PTC thermistor ceramic composition mentioned above in a ratio of 0.035 mol or less relative to 1 mol of Ti site in terms of element. In addition, the ratio is more preferably 0.005 mol or more and 0.02 mol or less. The Si precipitated at the grain boundary can form a compound with the alkali metal A which is also precipitated in a trace amount at the grain boundary, and can prevent the movement of the alkali metal A ion when electrified. Thus, an effect is provided to decrease the resistivity variation. However, if more than 0.035 mol of Si is contained, the excess element Si will segregate in a large quantity at the grain boundary so that the movement of conduction electrons will be inhibited and the resistivity at 25° C. tends to slightly deteriorate.

Preferably, Mn is contained in the PTC thermistor ceramic composition mentioned above in a ratio of 0.0015 mol or less relative to Ti site in terms of element. Further, the ratio is more preferably 0.0005 mol or more and 0.001 mol or less. If Mn is contained within the range mentioned above, a proper acceptor level will be formed at the grain boundary so that PTC jump will be improved. However, if more than 0.0015 mol of Mn is contained, the trap for the conduction electrons will be excess so that the resistivity at 25° C. tends to slightly deteriorate.

In formula (1), A represents at least one element selected from the group consisting of Na and K. The x representing the range of element Bi is related to y representing the range of A, and it is preferred that $1.02y \leq x \leq 1.5y$. If x is less than 1.02y, the resistivity variation will be larger than 20%. In addition, it is not preferred to render x higher than 1.5y because excess element Bi will precipitate in a large quantity at the grain boundary and the movement of the conduction electrons will be prevented. In this way, the resistivity at 25° C. will be higher than $10^3$ Ωcm.

In the compositional formula mentioned above, y representing the range of A is preferably $0.007 \leq y \leq 0.125$. When y is less than 0.007, the Curie temperature will not shift to a higher temperature. Meanwhile, y is not preferred to be more than 0.125 because the ceramic composition will not completely become semiconductive and the resistivity at 25° C. will be higher than $10^3$ Ωcm.

When the alkali metallic element A is Na or K, the shifting amounts of the Curie temperature towards a higher temperature are different in the two cases while the resistivity at 25° C. or the variation rates of the resistivity variation are almost the same.

In addition, it is more preferable that both Na and K are contained as A in the alkali metallic element and the molar ratio of Na to K is 6/4 or more and 9/1 or less. When the molar ratio of Na to K falls within the range mentioned above, the resistivity at 25° C. can be further decreased.

In addition, in the compositional formula mentioned above, the resistivity at 25° C. will decrease and the resistivity variation will also decrease when the total amount (w+z) of RE and TM which two are the donor components is 0.01 or less, but it will also work if neither RE nor TM is contained. Further, if the balance among the resistivity at 25° C., the PTC jump and the resistivity variation are to be considered, the mentioned total amount is preferred to be 0.001 mol or more and 0.005 mol or less. Further, if (w+z) is higher than 0.01, a part of the elements will segregate at the grain boundary to prevent the movement of the conduction electrons. Further, the effect on decreasing the resistivity at 25° C. and the effect on decreasing the resistivity variation tend to deteriorate. More preferably, RE is selected from the group consisting of Sm, Gd and Er, and Nb is selected as TM. More preferably, RE (Sm, Gd, Er) and TM (Nb) are added in equal amounts. With such types of donor and adding methods, the effect on decreasing the resistivity at 25° C. will be improved.

In the compositional formula mentioned above, $\alpha$ representing the molar ratio of Ba site to Ti site is in the range of $0.97 \leq \alpha \leq 1.06$. If $\alpha$ is less than 0.97, the resistivity variation will be over 20%. In addition, $\alpha$ is not preferred to be higher than 1.06 because the sintered density will decrease and the resistivity at 25° C. will be higher than $10^3$ $\Omega$cm. Preferably, when a is in the range of $1.01 \leq \alpha \leq 1.03$, the resistivity at 25° C. can be further decreased.

In addition, relative to the compositional formula mentioned above, the range of Ca which is added as a subcomponent is preferred to be 0.01 mol or more and lower than 0.05 mol. It is not preferable that less than 0.01 mol of Ca is contained because the ceramic composition will not turn semiconductive sufficiently and the resistivity at 25° C. will be higher than $10^3$ $\Omega$cm. On the other hand, the range of Ca is not preferred to be 0.05 mol or more because the sintered density will decrease and the resistivity at 25° C. will exceed $10^3$ $\Omega$cm. Preferably, Ca is contained in an amount of 0.03 mol or more and 0.04 mol or less. In this way, the resistivity at 25° C. can be further decreased.

The composition of the present invention is obtained by mixing compounds which contain elements constituting the compositional formula mentioned above, calcining the mixture, pulverizing the calcined powder, adding binders to granulate and molding the powder, debinding and then sintering. The sintering process can be performed either in air or in a nitrogen atmosphere. However, when the sintering process is performed in a nitrogen atmosphere, an additional thermal treatment at 800 to 1000° C. under an oxidative atmosphere has to be performed. Thus, from the viewpoint of simple processes, the sintering process is preferred to be performed in air.

The PTC jump in the present invention can be calculated through the following equation (6). The bigger the value calculated through the following equation (6) is, the higher the PTC jump will be and the better the PTC properties will be. In addition, $R_{max}$ in the following equation (6) refers to the maximum value of the resistivity in the resistivity-temperature characteristics and $R_{min}$ refers to the minimum value of the resistivity.

$$\text{PTC jump} = \text{Log}_{10}(R_{max}/R_{min}), \text{unit:digit} \quad (6)$$

EXAMPLES

Hereinafter, the present invention will be described in detail based on Examples and Comparative Examples, but the present invention will not be limited to the following Examples.

Example 1 (Samples No. 1 to 77) and Comparative Examples 1 to 29

$BaCO_3$, $TiO_2$, $Bi_2O_3$, $Na_2CO_3$, $K_2CO_3$, $CaCO_3$, $SiO_2$, $MnCO_3$, the oxide of RE (such as $Y_2O_3$), the oxide of TM (such as $Nb_2O_5$) were prepared as the raw material and then weighed to have the composition as shown in Table 1 to Table 8 after the sintering process. The resultant mixture was subjected to a wet mixing process with acetone in a ball mill followed by a drying process and a calcining process at 900° C. for 2 hours.

After the calcined body was subjected to a wet pulverizing process in pure water in a ball mill, the mixture was dehydrated to dry and then granulated with binders such as polyvinyl alcohol to provide a granulated powder. The granulated powder was molded to have a cylindrical shape (diameter of 17 mm×thickness of 1.0 mm) with a uniaxial press machine and then sintered at 1200° C. in air for 2 hours to provide a sintered body.

A paste of Ag—Zn was coated on both surfaces of the sintered body by screen printing, and the sintered body was baked at 500 to 700° C. in air and had the temperature measuring for the resistivity from 25° C. to 280° C. Further, the sample was put into a thermostatic bath at 25° C. and an electrifying test of 13V for 1000 hours was carried out. After this test, the resistivity at 25° C. was measured, and the variation rate of the resistivity was calculated compared to the resistivity before the test. The results from Example 1 of the present invention were shown in Table 1 to Table 8.

Example 2 (Sample No. 78)

PTC thermistors were prepared as in Example 1 and the same assessments were done as in Example 1 except that the sintering process was performed in a nitrogen atmosphere and a thermal treatment was further performed at 800° C. in air. The results from Example 2 of the present invention were shown in Table 9.

It could be known from Table 1 that y representing the range of A was related to the Curie temperature. A represented at least one element selected from the group consisting of Na and K. Based on Samples No. 1 to 10, it could be seen that when the range of A was $0.007 \leq y \leq 0.125$, the Curie temperature shifted to a temperature higher than the Curie temperature of barium titanate of 120° C. and the resistivity at 25° C. turned to $10^3$ $\Omega$cm or less. In addition, the bigger the y was, the more the Curie temperature would shift to a higher temperature and the resistivity at 25° C. tended to increase slightly. In Comparative Examples 1 and 3 where the range of A was less than 0.007, the resistivity at 25° C. was small and the Curie temperature did not shift to a temperature higher than 120° C. In Comparative Examples 2 and 4 where the range of A was higher than 0.125, the resistivity at 25° C. was found to exceed $10^3$ $\Omega$cm to a great extent. In addition, when A was Na or K, the shifting amounts of the Curie temperature towards a higher temperature were different in the two cases while resistivity at 25° C. or the resistivity variation was almost the same.

TABLE 1

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|
| Comparative Example 1 | 0.005 | 0.0075 | 1.06 | 0.049 | 0 | 0 | 0 | 300 | 3.6 | 120 | Na | 5 | Curie temperature x |
| 1 | 0.007 | 0.0105 | | | | | | 350 | 3.6 | 125 | | 7 | |
| 2 | 0.03 | 0.045 | | | | | | 350 | 3.6 | 150 | | 8 | |
| 3 | 0.05 | 0.075 | | | | | | 300 | 3.6 | 170 | | 8 | |
| 4 | 0.1 | 0.15 | | | | | | 400 | 3.6 | 210 | | 11 | |
| 5 | 0.125 | 0.1875 | | | | | | 600 | 3.6 | 220 | | 15 | |
| Comparative Example 2 | 0.127 | 0.1905 | | | | | | 1.0E+06 | — | — | | — | resistivity at 25° C. x |
| Comparative Example 3 | 0.005 | 0.0075 | 1.06 | 0.049 | 0 | 0 | 0 | 300 | 3.7 | 120 | K | 5 | Curie temperature x |
| 6 | 0.007 | 0.0105 | | | | | | 350 | 3.7 | 125 | | 9 | |
| 7 | 0.03 | 0.045 | | | | | | 350 | 3.7 | 160 | | 11 | |
| 8 | 0.05 | 0.075 | | | | | | 300 | 3.7 | 190 | | 11 | |
| 9 | 0.1 | 0.15 | | | | | | 400 | 3.7 | 235 | | 14 | |
| 10 | 0.125 | 0.1875 | | | | | | 600 | 3.7 | 245 | | 17 | |
| Comparative Example 4 | 0.127 | 0.1905 | | | | | | 1.0E+06 | — | — | | — | resistivity at 25° C. x |

According to Table 2, x representing the range of element Bi was related to y representing the range of A. It was known from Samples No. 1, 3, 5 and 11 to 16 that when x is in the range of $1.02y \leq x \leq 1.5y$, then the resistivity at 25° C. was small and the resistivity variation was inhibited to be 20% or less. When y was constant, the resistivity at 25° C. was likely to decrease slightly when x got larger. In Comparative Examples 5, 7 and 9 where x was lower than 1.02y, the resistivity at 25° C. was small and the resistivity variation exceeded 20%. Meanwhile, in Comparative Examples 6, 8 and 10 where x exceeded 1.5y, the resistivity at 25° C. became larger to exceed $10^3$ Ωcm.

According to Table 3, it was known that in Sample No. 71 to 74 where the alkali metal A contained both Na and K and the molar ratio of Na to K was 6/4 or more and 9/1 or less, the resistivity at 25° C. was lower than that in Sample No. 15 which contained only Na and that in Sample No. 77 which contained only K. In addition, it could be seen that the resistivity at 25° C. was not smaller but a little bigger in Sample No. 75 with a molar ratio of 5/5 and Sample No. 76 with a molar ratio of 2/8 when both Na and K were contained compared to samples containing only Na or only K.

TABLE 2

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|
| Comparative Example 5 | 0.007 | 0.007 | 1.06 | 0.049 | 0 | 0 | 0 | 500 | 3.4 | 125 | Na | 22 | resistivity variationx |
| 11 | | 0.00714 | | | | | | 400 | 3.6 | | | 10 | |
| 12 | | 0.00875 | | | | | | 370 | 3.6 | | | 9 | |
| 1 | | 0.0105 | | | | | | 350 | 3.6 | | | 7 | |
| Comparative Example 6 | | 0.0112 | | | | | | 1.0E+04 | — | — | | — | resistivity at 25° C. x |
| Comparative Example 7 | 0.05 | 0.05 | 1.06 | 0.049 | 0 | 0 | 0 | 500 | 3.5 | 170 | Na | 22 | resistivity variationx |
| 13 | | 0.051 | | | | | | 400 | 3.7 | | | 10 | |
| 14 | | 0.0625 | | | | | | 350 | 3.6 | | | 9 | |
| 3 | | 0.075 | | | | | | 300 | 3.6 | | | 8 | |
| Comparative Example 8 | | 0.08 | | | | | | 1.00E+04 | — | — | | — | resistivity at 25° C. x |
| Comparative Example 9 | 0.125 | 0.125 | 1.06 | 0.049 | 0 | 0 | 0 | 700 | 3.4 | 220 | Na | 23 | resistivity variationx |
| 15 | | 0.1275 | | | | | | 700 | 3.7 | | | 16 | |
| 16 | | 0.15625 | | | | | | 650 | 3.6 | | | 16 | |
| 5 | | 0.1875 | | | | | | 600 | 3.6 | | | 15 | |
| Comparative Example 10 | | 0.2 | | | | | | 1.0E+05 | — | — | | — | resistivity at 25° C. x |

TABLE 3

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | Na/K | resistivity variation [%] | Note |
|---|---|---|---|---|---|---|---|---|---|---|---|---|---|
| 15 | 0.125 | 0.1275 | 1.06 | 0.049 | 0 | 0 | 0 | 700 | 3.7 | 220 | 10/0 | 7 | |
| 71 | | | | | | | | 600 | 3.7 | 220 | 9/1 | 7 | more preferable |
| 72 | | | | | | | | 440 | 3.8 | 220 | 8/2 | 8 | more preferable |
| 73 | | | | | | | | 500 | 3.8 | 225 | 7/3 | 8 | more perferable |
| 74 | | | | | | | | 620 | 3.6 | 230 | 6/4 | 10 | more perferable |
| 75 | | | | | | | | 780 | 3.6 | 230 | 5/5 | 10 | |
| 76 | | | | | | | | 800 | 3.7 | 240 | 2/8 | 9 | |
| 77 | | | | | | | | 800 | 3.7 | 245 | 0/10 | 9 | |

It could be known from Table 4 that the molar ratio α of Ba site to Ti site was related to the resistivity variation and the resistivity at 25° C. It was also known that in Samples No. 15 and 17 to 19 in which a was in the range of 0.97≤α≤1.06, the resistivity at 25° C. was small and the variation rate of the resistivity variation was inhibited at a level of 20% or lower. Meanwhile, in Comparative Example 11 with a being less than 0.97 and Comparative Example 12 with a being larger than 1.06, the resistivity variation exceeded 20% and the resistivity at 25° C. exceeded $10^3$ Ωcm.

TABLE 4

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|
| Comparative Example 11 | 0.125 | 0.1275 | 0.96 | 0.049 | 0 | 0 | 0 | 1.0E+04 | — | 220 | Na | 30 | resistivity at 25° C. x |
| 17 | | | 0.97 | | | | | 700 | 3.3 | | | 20 | |
| 18 | | | 1.0 | | | | | 600 | 3.5 | | | 20 | |
| 19 | | | 1.03 | | | | | 650 | 3.6 | | | 15 | |
| 15 | | | 1.06 | | | | | 700 | 3.7 | | | 16 | |
| Comparative Example 12 | | | 1.07 | | | | | 3000 | 3.7 | | | 23 | resistivity variationx |

According to Table 5, it was known that the range of Ca as the sub-component was related to the resistivity at 25° C. In Samples No. 15, 20 and 21 in which Ca was contained in an amount of 0.01 mol or more and less than 0.05 mol, the resistivity at 25° C. was small and the resistivity variation was inhibited to be 20% or less. It was also known that the more the amount of Ca was, the more likely the resistivity at 25° C. tended to increase. On the other hand, in Comparative Example 13 with the amount of Ca being less than 0.01 mol and Comparative Example 14 with the amount of Ca being 0.05 mol or more, the resistivity at 25° C. increased to be higher than $10^3$ Ωcm.

It could be seen from Samples No. 15 and 22 to 24 in Table 6 that an effect on decreasing the resistivity variation was provided when the range of Si as the sub-component was 0.035 or less. Further, when Si was contained in an amount of 0.005 mol or more and 0.02 mol or less, the effect on decreasing the resistivity variation could be more evident. On the other hand, in Comparative Example 15 where the range of Si exceeded 0.035 mol, little effect was provided on decreasing the resistivity variation.

TABLE 5

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|
| Comparative Example 13 | 0.125 | 0.1275 | 1.06 | 0.008 | 0 | 0 | 0 | 1.0E+04 | — | 220 | Na | — | resistivity at 25° C. x |
| 20 | | | | 0.01 | | | | 500 | 3.6 | | | 10 | |
| 21 | | | | 0.03 | | | | 600 | 3.6 | | | 15 | |
| 15 | | | | 0.049 | | | | 700 | 3.7 | | | 16 | |
| Comparative Example 14 | | | | 0.05 | | | | 1.0E+04 | — | | | — | resistivity at 25° C. x |

TABLE 6

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|
| 15 | 0.125 | 0.1275 | 1.06 | 0.049 | 0 | 0 | 0 | 700 | 3.7 | 220 | Na | 16 | |
| 22 | | | | | | 0.005 | | 700 | 3.7 | | | 13 | |
| 23 | | | | | | 0.02 | | 670 | 3.7 | | | 8 | |
| 24 | | | | | | 0.035 | | 700 | 3.6 | | | 15 | |
| Comparative Example 15 | | | | | | 0.037 | | 980 | 3.6 | | | 16 | the effect on decreasing the resistivity variation is small |

According to Samples No. 15 and 25 to 28 in Table 7, it was known that if 0.0015 mol or less of Mn was contained, the more the amount was, and then the higher the PTC jump would be. If both the resistivity at 25° C. and the PTC jump were to be considered, it was more preferable that 0.0005 mol or more and 0.001 mol or less of Mn was contained. However, as shown in Comparative Example 16, if the content of Mn exceeded 0.0015 mol, the resistivity at 25° C. tended to deteriorate slightly and the effect on improving the PTC jump was small.

TABLE 7

| Sample No. | y [mol] | x [mol] | α | Ca [mol] | w + z [mol] | Si [mol] | Mn [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|
| 15 | 0.125 | 0.1275 | 1.06 | 0.049 | 0 | 0 | 0 | 700 | 3.7 | 220 | Na | 16 | |
| 25 | | | | | | | 0.0005 | 710 | 3.8 | | | 16 | |
| 26 | | | | | | | 0.00075 | 750 | 4.0 | | | 16 | |
| 27 | | | | | | | 0.001 | 760 | 4.3 | | | 16 | |
| 28 | | | | | | | 0.0015 | 800 | 4.3 | | | 17 | |
| Comparative Example 16 | | | | | | | 0.0017 | 990 | 3.7 | | | 18 | the effect on improving PTC jump is small |

It was known from Samples No. 15 and 29 to 70 in Table 8 that if the total amount (w+z) of RE and TM was 0.01 or less, the effect on decreasing the resistivity variation would be provided. If the balance among the resistivity at 25° C., the PTC jump and the resistivity variation was considered, the total amount was more preferably 0.001 mol or more and 0.005 mol or less. It was also known that when Sm, Gd or Er was used as RE and Nb was used as TM, the resistivity at 25° C. was smaller than that in the cases when other elements were used as RE and TM. Further, in Comparative Examples 17 to 29 where (w+z) exceeded 0.01, the resistivity at 25° C. was higher than $10^3$ Ωcm. Furthermore, in Samples No. 65 to 70, the resistivity at 25° C. was smaller when RE and TM were added in equal amounts even if (w+z) was kept at a same level.

TABLE 8

| Sample No | y [mol] | x [mol] | α | Ca [mol] | Si [mol] | Mn [mol] | RE | TM | w [mol] | z [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|---|---|---|
| 15 | 0.125 | 0.1275 | 1.06 | 0.049 | 0 | 0 | Y | | 0 | 0 | 700 | 3.7 | 220 | Na | 16 | |
| 29 | | | | | | | | | 0.001 | 0 | 680 | 3.7 | | | 14 | |
| 30 | | | | | | | | | 0.005 | 0 | 650 | 3.6 | | | 13 | |
| 31 | | | | | | | | | 0.01 | 0 | 690 | 3.5 | | | 15 | |
| Comparative Example 17 | | | | | | | | | 0.012 | 0 | 5000 | — | | | — | resistivity at 25° C. x |
| 32 | 0.125 | 0.1275 | 1.06 | 0.049 | 0 | 0 | La | | 0.001 | 0 | 670 | 3.7 | 220 | Na | 14 | |
| 33 | | | | | | | | | 0.005 | 0 | 630 | 3.6 | | | 14 | |
| 34 | | | | | | | | | 0.01 | 0 | 690 | 3.5 | | | 15 | |
| Comparative Example 18 | | | | | | | | | 0.012 | 0 | 10000 | — | | | — | resistivity at 25° C. x |
| 35 | 0.125 | 0.1275 | 1.06 | 0.049 | 0 | 0 | Ce | | 0.001 | 0 | 680 | 3.7 | 220 | Na | 14 | |
| 36 | | | | | | | | | 0.005 | 0 | 650 | 3.6 | | | 14 | |
| 37 | | | | | | | | | 0.01 | 0 | 700 | 3.5 | | | 15 | |
| Comparative Example 19 | | | | | | | | | 0.012 | 0 | 5000 | — | | | — | resistivity at 25° C. x |
| 38 | 0.125 | 0.1275 | 1.06 | 0.049 | 0 | 0 | Pr | | 0.001 | 0 | 680 | 3.7 | 220 | Na | 14 | |
| 39 | | | | | | | | | 0.005 | 0 | 650 | 3.6 | | | 13 | |
| 40 | | | | | | | | | 0.01 | 0 | 690 | 3.5 | | | 15 | |
| Comparative Example 20 | | | | | | | | | 0.012 | 0 | 3000 | — | | | — | resistivity at 25° C. x |
| 41 | 0.125 | 0.1275 | 1.06 | 0.049 | 0 | 0 | Nd | | 0.001 | 0 | 680 | 3.7 | 220 | Na | 14 | |
| 42 | | | | | | | | | 0.005 | 0 | 660 | 3.6 | | | 14 | |
| 43 | | | | | | | | | 0.01 | 0 | 690 | 3.5 | | | 15 | |
| Comparative Example 21 | | | | | | | | | 0.012 | 0 | 6000 | — | | | — | resistivity at 25° C. x |
| 44 | 0.125 | 0.1275 | 1.06 | 0.049 | 0 | 0 | Sm | | 0.001 | 0 | 660 | 3.7 | 220 | Na | 14 | |
| 45 | | | | | | | | | 0.005 | 0 | 600 | 3.6 | | | 13 | |
| 46 | | | | | | | | | 0.01 | 0 | 670 | 3.5 | | | 16 | |
| Comparative Example 22 | | | | | | | | | 0.012 | 0 | 3000 | — | | | — | resistivity at 25° C. x |
| 47 | 0.125 | 0.1275 | 1.06 | 0.049 | 0 | 0 | Gd | | 0.001 | 0 | 650 | 3.7 | 220 | Na | 14 | |
| 48 | | | | | | | | | 0.005 | 0 | 600 | 3.6 | | | 14 | |
| 49 | | | | | | | | | 0.01 | 0 | 680 | 3.5 | | | 15 | |
| Comparative Example 23 | | | | | | | | | 0.012 | 0 | 3000 | — | | | — | resistivity at 25° C. x |
| 50 | 0.125 | 0.1275 | 1.06 | 0.049 | 0 | 0 | Dy | | 0.001 | 0 | 680 | 3.7 | 220 | Na | 14 | |
| 51 | | | | | | | | | 0.005 | 0 | 670 | 3.6 | | | 13 | |
| 52 | | | | | | | | | 0.01 | 0 | 690 | 3.5 | | | 15 | |
| Comparative Example 24 | | | | | | | | | 0.012 | 0 | 6000 | — | | | — | resistivity at 25° C. x |
| 53 | 0.125 | 0.1275 | 1.06 | 0.049 | 0 | 0 | Er | | 0.001 | 0 | 650 | 3.7 | 220 | Na | 14 | |
| 54 | | | | | | | | | 0.005 | 0 | 600 | 3.6 | | | 13 | |
| 55 | | | | | | | | | 0.01 | 0 | 670 | 3.5 | | | 16 | |

TABLE 8-continued

| Sample No | y [mol] | x [mol] | α | Ca [mol] | Si [mol] | Mn [mol] | RE | TM | w [mol] | z [mol] | resistivity at 25° C. [Ωcm] | PTC jump [FIG.] | Tc [° C.] | A Na or K | resistivity variation [%] | Note |
|---|---|---|---|---|---|---|---|---|---|---|---|---|---|---|---|---|
| Comparative Example 25 | | | | | | | | | 0.012 | 0 | 3000 | — | | | — | resistivity at 25° C. x |
| 56 | 0.125 | 0.1275 | 1.06 | 0.049 | 0 | 0 | | V | 0 | 0.001 | 680 | 3.7 | 220 | Na | 13 | |
| 57 | | | | | | | | | 0 | 0.005 | 650 | 3.6 | | | 11 | |
| 58 | | | | | | | | | 0 | 0.01 | 700 | 3.5 | | | 15 | |
| Comparative Example 26 | | | | | | | | | 0 | 0.012 | 10000 | — | | | — | resistivity at 25° C. x |
| 59 | 0.125 | 0.1275 | 1.06 | 0.049 | 0 | 0 | | Nb | 0 | 0.001 | 650 | 3.7 | 220 | Na | 12 | |
| 60 | | | | | | | | | 0 | 0.005 | 620 | 3.6 | | | 12 | |
| 61 | | | | | | | | | 0 | 0.01 | 660 | 3.5 | | | 14 | |
| Comparative Example 27 | | | | | | | | | 0 | 0.012 | 3000 | — | | | — | resistivity at 25° C. x |
| 62 | 0.125 | 0.1275 | 1.06 | 0.049 | 0 | 0 | | Ta | 0 | 0.001 | 680 | 3.7 | 220 | Na | 13 | |
| 63 | | | | | | | | | 0 | 0.005 | 660 | 3.6 | | | 13 | |
| 64 | | | | | | | | | 0 | 0.01 | 690 | 3.5 | | | 15 | |
| Comparative Example 28 | | | | | | | | | 0 | 0.012 | 7000 | — | | | — | resistivity at 25° C. x |
| 65 | 0.125 | 0.1275 | 1.06 | 0.049 | 0 | 0 | Gd | Nb | 0.0025 | 0.0025 | 570 | 3.6 | 220 | Na | 12 | |
| 66 | | | | | | | | | 0.001 | 0.004 | 600 | 3.6 | | | 13 | |
| 67 | | | | | | | | | 0.004 | 0.001 | 600 | 3.6 | | | 13 | |
| 68 | | | | | | | | | 0.005 | 0.005 | 620 | 3.5 | | | 14 | |
| 69 | | | | | | | | | 0.002 | 0.008 | 670 | 3.5 | | | 15 | |
| 70 | | | | | | | | | 0.008 | 0.002 | 670 | 3.5 | | | 15 | |
| Comparative Example 29 | | | | | | | | | 0.006 | 0.006 | 10000 | — | | | — | resistivity at 25° C. x |

It could be seen from Sample No. 78 in Table 9 that a composition obtained when the atmosphere during the sintering process was set as a nitrogen atmosphere ($PO_2=10^{-7}$ atm) has almost the same properties as that sintered in air.

TABLE 9

| Sample No. | Atmospheric gas in sintering process | y[mol] | x[mol] | α | Ca[mol] | w + z [mol] | Si [mol] | Mn [mol] | resisitvity at 25° C. [Ωcm] | PTC jump [FIG.] | Tc [° C.] | A Na or K | resistivity variation [%] |
|---|---|---|---|---|---|---|---|---|---|---|---|---|---|
| 15 | air | 0.125 | 0.1275 | 1.06 | 0.049 | 0 | 0 | 0 | 700 | 3.7 | 220 | Na | 16 |
| 78 | nitrogen | | | | | | | | 650 | 3.6 | | | 15 |

What is claimed is:

1. A PTC thermistor ceramic composition, comprising a sintered body comprising a barium titanate based compound represented by the following formula (1) as the main component, $$(Ba_{1-x-y-w}Bi_xA_yRE_w)_\alpha(Ti_{1-z}TM_z)O_3 \quad (1),$$

wherein, in the formula (1), A represents at least one element selected from the group consisting of Na and K, RE represents at least one element selected from the group consisting of Y, La, Ce, Pr, Nd, Sm, Gd, Dy and Er, TM represents at least one element selected from the group consisting of V, Nb and Ta, and w, x, y, z and α satisfy the following in equations (2) to (5), in which, the units of w, x, y and z are all mole, and a represents the molar ratio of Ba site to Ti site, $$1.02y \leq x \leq 1.5y \quad (2)$$

$$0.007 \leq y \leq 0.125 \quad (3)$$

$$0 \leq (w+z) \leq 0.01 \quad (4)$$

$$0.97 \leq \alpha \leq 1.06 \quad (5), \text{ and}$$

Ca is further contained in a ratio of 0.01 mol or more and less than 0.05 mol relative to 1 mol of Ti site in terms of element.

2. The PTC thermistor ceramic composition of claim 1, wherein,
Si is further contained in the PTC thermistor ceramic composition in a ratio of 0.035 mol or less relative to 1 mol of Ti site in terms of element.

3. The PTC thermistor ceramic composition of claim 2, wherein,
Mn is further contained in the PTC thermistor ceramic composition in a ratio of 0.0015 mol or less relative to 1 mol of Ti site in terms of element.

4. The PTC thermistor ceramic composition of claim 3, wherein,
both Na and K are contained as A in the PTC thermistor ceramic composition, and the molar ratio of Na to K is in the range of 6/4 or more and 9/1 or less.

5. A PTC thermistor comprising a ceramic element and electrodes formed on the surface of the ceramic element, wherein,
the ceramic element is formed by using the PTC thermistor ceramic composition of claim 4.

6. A PTC thermistor comprising a ceramic element and electrodes formed on the surface of the ceramic element, wherein,
the ceramic element is formed by using the PTC thermistor ceramic composition of claim 3.

7. The PTC thermistor ceramic composition of claim 2, wherein,
both Na and K are contained as A in the PTC thermistor ceramic composition, and the molar ratio of Na to K is in the range of 6/4 or more and 9/1 or less.

8. A PTC thermistor comprising a ceramic element and electrodes formed on the surface of the ceramic element, wherein,
the ceramic element is formed by using the PTC thermistor ceramic composition of claim 7.

9. A PTC thermistor comprising a ceramic element and electrodes formed on the surface of the ceramic element, wherein,
the ceramic element is formed by using the PTC thermistor ceramic composition of claim 2.

10. The PTC thermistor ceramic composition of claim 1, wherein,
Mn is further contained in the PTC thermistor ceramic composition in a ratio of 0.0015 mol or less relative to 1 mol of Ti site in terms of element.

11. The PTC thermistor ceramic composition of claim 10, wherein,
both Na and K are contained as A in the PTC thermistor ceramic composition, and the molar ratio of Na to K is in the range of 6/4 or more and 9/1 or less.

12. A PTC thermistor comprising a ceramic element and electrodes formed on the surface of the ceramic element, wherein,
the ceramic element is formed by using the PTC thermistor ceramic composition of claim 11.

13. A PTC thermistor comprising a ceramic element and electrodes formed on the surface of the ceramic element, wherein,
the ceramic element is formed by using the PTC thermistor ceramic composition of claim 10.

14. The PTC thermistor ceramic composition of claim 1, wherein,
both Na and K are contained as A in the PTC thermistor ceramic composition, and the molar ratio of Na to K is in the range of 6/4 or more and 9/1 or less.

15. A PTC thermistor comprising a ceramic element and electrodes formed on the surface of the ceramic element, wherein,
the ceramic element is formed by using the PTC thermistor ceramic composition of claim 14.

16. A PTC thermistor comprising a ceramic element and electrodes formed on the surface of the ceramic element, wherein,
the ceramic element is formed by using the PTC thermistor ceramic composition of claim 1.

* * * * *